United States Patent [19]

Fujishima et al.

[11] Patent Number: 5,171,949
[45] Date of Patent: Dec. 15, 1992

[54] SWITCHING POWER SUPPLY FOR MICROWAVE OVEN

[75] Inventors: Kunihiro Fujishima, Moriguchi; Hitoshi Yoshioka, Kawasaki, both of Japan

[73] Assignees: Sanyo Electric Co., Ltd.; Yutaka Electric Mfg. Co., Ltd., both of Japan

[21] Appl. No.: 607,392

[22] Filed: Oct. 31, 1990

[30] Foreign Application Priority Data

Dec. 29, 1989 [JP] Japan ............................ 1-344517

[51] Int. Cl.$^5$ ............................................ H05B 6/68
[52] U.S. Cl. ............................ 219/10.55 B; 363/49; 323/90.1
[58] Field of Search ............ 219/10.55 B; 363/49, 363/21; 323/901

[56] References Cited

U.S. PATENT DOCUMENTS

| | | | |
|---|---|---|---|
| 3,398,371 | 8/1968 | Lamb | 219/10.55 B |
| 3,611,017 | 10/1971 | Freeland | 219/10.55 B |
| 4,866,589 | 9/1989 | Satoo et al. | 363/21 |
| 4,866,590 | 9/1989 | Odaka et al. | 363/49 |
| 4,962,292 | 10/1990 | Aoki | 219/10.55 B |
| 4,967,051 | 10/1990 | Maehara et al. | 219/10.55 B |
| 4,992,637 | 2/1991 | Ishiyama | 219/10.55 B |
| 5,003,141 | 3/1991 | Braunisch et al. | 219/10.55 B |
| 5,082,998 | 1/1992 | Yoshioka | 219/10.55 B |

*Primary Examiner*—Philip H. Leung
*Attorney, Agent, or Firm*—Lowe, Price, LeBlanc & Becker

[57] ABSTRACT

The present invention relates to a switching power supply a microwave oven in which DC power is changed to a pulse form by means of a switching element coupled to a primary winding of an inverter transformer to supply the power to a high frequency oscillator (hereinafter referred to as a magnetron) coupled to a secondary winding. A reference voltage is set lower than an ordinary state from the time of turning on until the oscillation of the magnetron starts. Accordingly, power supplied from the secondary winding of the inverter transformer to the magnetron is set to a low level. The reference voltage increases when oscillation of the magnetron starts, and returns to the ordinary state when the oscillation returns to the ordinary state.

6 Claims, 4 Drawing Sheets

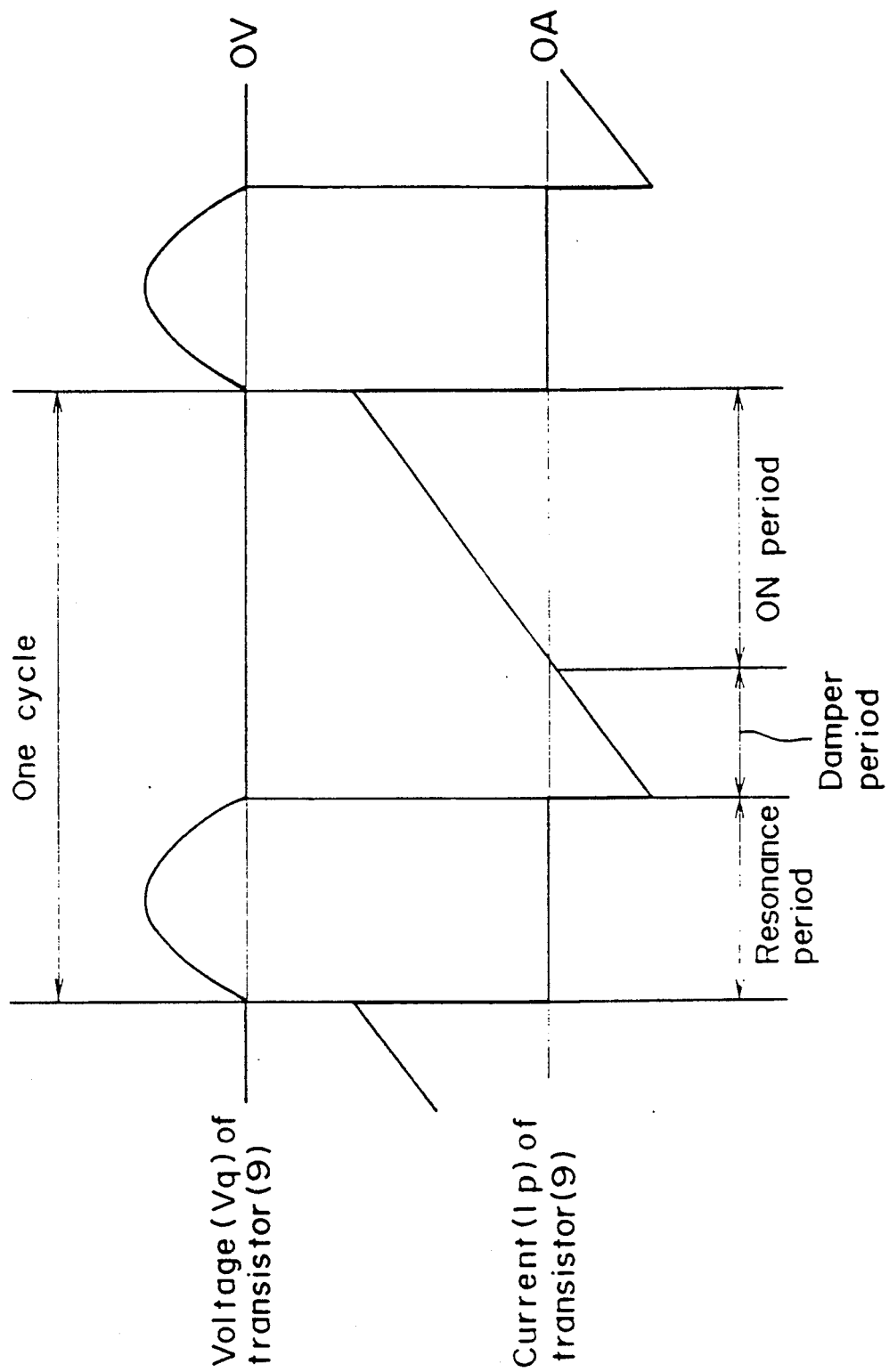

SWITCHING POWER SUPPLY FOR MICROWAVE OVEN

BACKGROUND OF THE INVENTION (1) Field of the Invention

The present invention relates to a self-excited system voltage resonance type switching power source supply which is used as a power source for an inverter system microwave oven and, in particular, relates to an invention to protect against an over load of an inverter circuit from the time of turning on until oscillation of the magnetron starts and against damage caused by applying an extraordinary high voltage to the inverter transformer secondary side parts.

(2) Description of the Prior Art

According to a control circuit of the conventional inverter system microwave oven, the over load from the time of turning on to the time of initiation of oscillation of the magnetron was avoided by such like high voltage of the transistor which works as a switching element. The time from when the magnetron turns on to the time of starting oscillation was 1 to 5 second, which changes largely due to a peripheral temperature and the dispersion of the magnetron itself. Further, since controlling of such time by a charging time of a capacitor and a time constant delay circuit by a timer IC has no relation with the oscillation characteristics of the magnetron, it was not possible to obtain secure operation.

The switching power supply for a microwave oven is a flyback system using a leakage transformer in which the connection between the primary side and the secondary side is poor, and in which the magnetron, which forms a load for inverter circuit, becomes almost a no-load condition until the oscillation starts.

In this no-load condition, electro-magnetic energy which is supplied to the leakage transformer at the time when the inverter circuit is in the ON state is fed back to the inverter circuit itself as a flyback power at the time of OFF state. As a result there arises an over load condition, thereby causing the breakage of the switching transistor and so on, or application of an extraordinary high voltage on the inverter transformer secondary parts, thereby breaking the secondary circuit.

According to the conventional art, it was needed to contain high voltage and large amount of current transistor, capacitor, transformer winding and so on in order to prevent the breakage due to the over load of the inverter circuit. Thus, there resulted an expensive circuit having high allowance and surplus design.

A first object of the present invention is thus to form the circuit based only on operation in the ordinary loaded condition by reducing the over load of the inverter circuit at the time of no-load condition until the magnetron starts its oscillation after it turns on.

A second object of the present invention is to provide an improved switching power supply having high reliability with small size and low cost.

Other objects and features of the present invention will be clarified by the following explanation.

BRIEF SUMMARY OF THE INVENTION

The present invention relates to a switching power supply for a microwave oven in which a DC power is changed to a pulse power by means of a power switching element coupled to a primary winding of an inverter transformer to supply the power to a magnetron coupled to a secondary winding, wherein the switching power supply comprises a section for detecting voltage corresponding to a passing current of the power switching element, a section for setting a reference voltage, a comparator for comparing the reference voltage with a voltage from the section for detecting voltage, a switching element for controlling switching of said power switching element by the output from the comparator, and a section for controlling the reference voltage in order to set the reference voltage lower than the ordinary condition until the magnetron starts its oscillation.

From the time of turning on to the time of when the magnetron starts its oscillation, the reference voltage is set lower than the ordinary condition by the section for controlling the reference voltage. Therefore, the power supplied from the secondary winding of the inverter transformer to the magnetron is also set to a low level. Since the reference voltage increases due to starting of the oscillation of the magnetron, the power supplied to the magnetron also increases, and the reference voltage attains becomes the ordinary level when the oscillation attains the ordinary state.

BRIEF DESCRIPTION OF THE DRAWINGS

FIG. 4 is an illustration showing voltage waveform.

DETAILED DESCRIPTION

Figure 1:
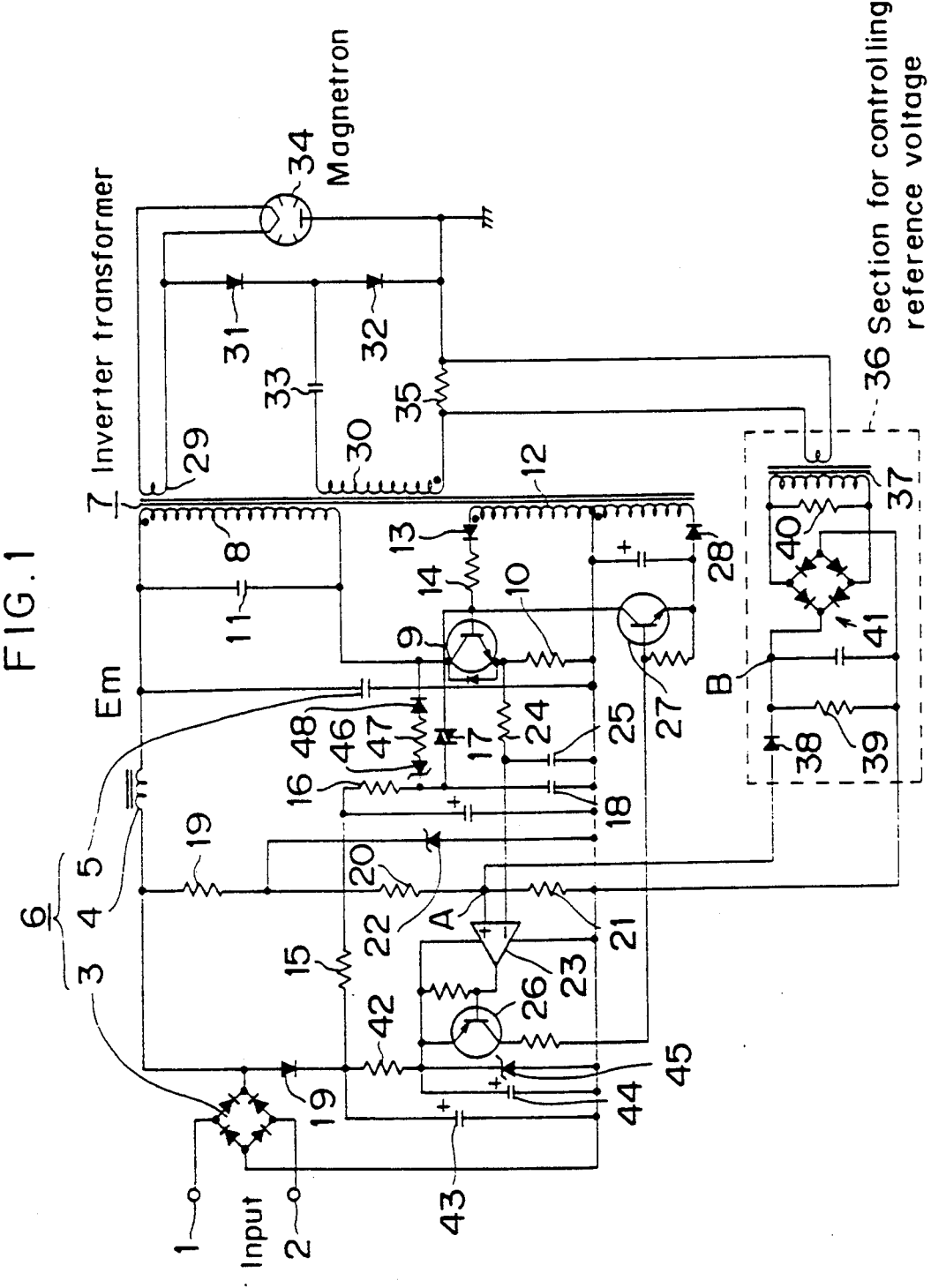
FIG. 1 is a circuit diagram showing a switching power supply for microwave oven in the first embodiment according to the present invention.

FIG. 1 is an illustration showing the first embodiment of the present invention, wherein a rectifying and smoothing circuit (6) comprising a full wave rectifier (3), an inductor (4), and a capacitor (5) is coupled to AC power input terminals (1) and (2). A serial circuit comprising a primary winding (8) of an inverter transformer (7), a main transistor (9) functioning as the switching element and a resistor (10) which functions for detecting voltage corresponding to the current of the main transistor (9) is coupled between the two ends of capacitor (5). A resonance capacitor (11) is coupled to the primary winding (8) in parallel. The inverter transformer (7) has a supplementary winding (12). One end of this supplementary winding (12) is coupled to a base of the main transistor (9) through a diode (13) and a resistor (14), and another end is coupled to the negative side thereof. Further, a starting circuit comprising resistors (15) and (16), a trigger diode (17), and a capacitor (18) is inserted into the base of the main transistor (9).

A section for setting reference voltage comprising resistors (19), (20), and (21) and a Zener diode (22) is coupled between both ends of the full wave rectifier, and a connection node (A) of the resistors (20) and (21) is coupled to the positive side of a comparator (23). In the negative side of the comparator (23), the resistor (10) is coupled to an emitter of the main transistor (9) and works as the section for detecting voltage corresponding to the passing current, is coupled through an integrating circuit comprising a capacitor (25) and a resistor (24). The output side of the comparator (23) is coupled to the base of a supplementary transistor (27) through an amplifier transistor (26). A collector of supplementary transistor (27) is coupled to the base of the main transistor (9), and the emitter is coupled to the other end of the supplementary winding (12) through the diode (28). Diodes (31) and (32), a capacitor (33), a magnetron (34), and a resistor (35) are coupled to secondary windings (29) and (30) of the inverter transformer (7).

A section (36) for controlling reference voltage is inserted between an anode of the magnetron (34) and the resistor (21) for setting reference voltage. Namely, the anode of the magnetron (34) is coupled to the primary side of the current transformer (37). Further, a serial circuit of diode (38) and resistor (39) is coupled in parallel to the resistor (21) for setting reference voltage. The secondary side of the current transformer (37) is coupled to both sides of the resistor (39) through resistor (40) and a rectifying and smoothing circuit (41) for taking out as the voltage.

A supplementary power supply comprising a resistor (42), capacitors (43) and (44), and a Zener diode (45) is coupled to input terminals (1) and (2). Further, in order to quicken the stop of oscillation of the inverter extremely due to the sudden change of the load and a pulsating flow of input, a Zener diode (46), a resistor (47), and a diode (48) are coupled to the collector of the main transistor (9).

The function based on the above mentioned structure will be explained as follows.

Figure 2:
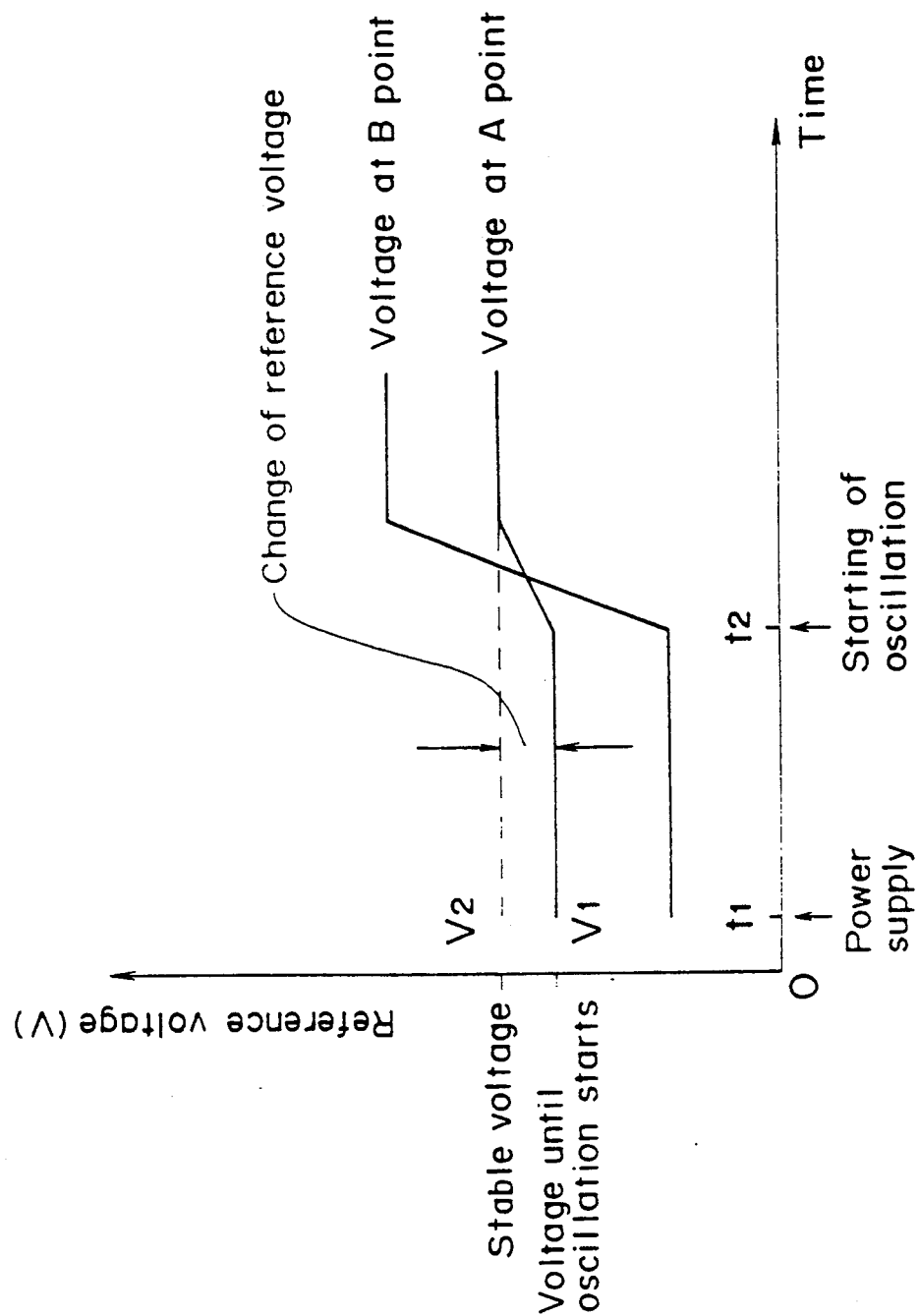
FIG. 2 is an illustration showing voltage waveform of each part.

When the power supply is turned on at $t_1$ of FIG. 2, AC power is rectified by the full wave rectifier (3) and is stored in the capacitor (5). A starting current is added to the base of the main transistor (9) through the starting circuit, then the main transistor starts ON state. So, the collector current of the main transistor (9) increases linearly by the inductance of the primary winding (8) of the inverter transformer (7) coupled in series, thereby generating a voltage having the same phase in the supplementary winding (12) provided on the inverter transformer (7) at the same time. This voltage is rectified by the diode (13) to increase the base current of the main transistor (9) further, thereby promoting the ON state of the main transistor (9).

Since the anode current does not flow after the power supply turns on and before the magnetron (34) starts its oscillation, the voltage is not applied to the resistor (40) in the secondary side of the section (36) for controlling reference voltage. Accordingly, at point A of the section for setting reference voltage, a low voltage $V_1$ set by resistor (21), diode (38), and resistor (39), is applied to the positive side of the comparator (23). Then, the collector current of the main transistor (9) increases, when the voltage in the resistor (10) of the section for detecting voltage exceeds the low voltage ($V_1$) provided as the voltage, an output appears from the comparator (23). The generated output turns on the supplementary transistor (27) through the transistor (26). Therefore, the base voltage of main transistor (9) is suddenly pulled to the negative side, thereby turning transistor (9) off immediately. After that, inverter circuit finishes one cycle of operation after a resonance period caused by the capacity of the resonance capacitor (11) and by an inductance of the inverter transformer (7) and after a damper period by a damper diode.

Then, the oscillation is continued by repeating the action as shown in FIG. 4.

The voltage at the secondary side of the inverter transformer (7) is $$\text{boosted by } \frac{\text{secondary winding}}{\text{primary winding}} = N$$

and the boosted voltage is applied on the magnetron (34) through the high voltage rectifying circuit. A cathode of the magnetron (34) is heated through the heater winding (29). The magnetron (34) does not oscillate until the cathode is heated. Namely, since the magnetron is in the approximately no-load condition, the voltage equal to N times of primary resonance voltage is applied. On the other hand, since the magnetron (34) has the A characteristic by which it starts its oscillation when the voltage reaches about 4 KV, it is necessary to set the primary resonance voltage higher than 4/N. Further, since the magnetron (34) has 10 KV of resisting pressure when it is in the no-load condition, it is necessary to set the primary resonance voltage lower than 10/N KV. However, if the resisting pressure of high voltage capacitor and diode and so on are taken into consideration, a primary resonance voltage equal to or lower than 7 KV is preferable. Accordingly, it is preferable to design the circuit with the primary resonance voltage in the range of 4/N to 7/N KV.

The primary resonance voltage is a function of the primary side peak current, and the reference voltage ($V_1$) is set about half of the peak current at the time of a rated loaded condition in the present embodiment.

If the cathode of the magnetron (34) is heated and the magnetron (34) starts its oscillation at the time of $t_2$, the anode current suddenly increases. The increased current is detected by the current transformer (37) to convert to a voltage by the secondary side resistor (40) and the resulting current is rectified and smoothed. In accordance with the increment of the voltage at point B of the secondary side, the reference voltage increases little by little. When the voltage at point A is higher than the total voltage of that at point B and a forward directional voltage of the diode (38), the serial circuit of the diode (38) and resistor (39) becomes cut off against the divided resistors (20) and (21), and the reference voltage becomes the ordinary operating value of ($V_2$). Therefore, the power for supplying from the inverter transformer (7) to the magnetron (34) becomes the ordinary value to start self-excited oscillation by the ordinary operation having fixed power.

Figure 3:
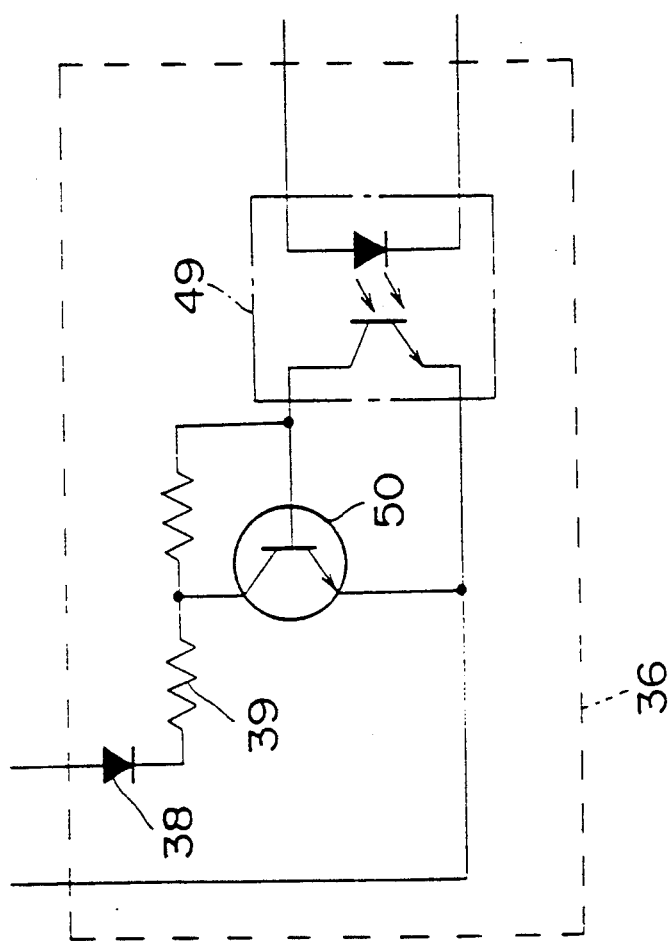
FIG. 3 is a circuit diagram showing another embodiment of the present invention.

The embodiment based on FIG. 1 shows a section (36) for controlling reference voltage essentially comprising the current transformer (37), the resistor (40), and the rectifying circuit (41). However, as shown in FIG. 3, a section for controlling reference voltage essentially comprising an optical isolator (49) and a transistor (50) can be used.

The actual measured values according to the embodiment of the present invention are as follows.

N=14

Lp=40 μH (primary inductance at the time of releasing secondary windings (29) and (30) of transformer (7))

Ll=22 μH (leakage inductance at the time of short-circuit of secondary windings (29) and (30) of transformer (7))

$$E_m = 100 \times \sqrt{2} \approx 141 \text{ V}$$

(maximum power between both ends of capacitor (5))

Ip=42 A (maximum peak current of main transistor (9))

Ip'=21 A (maximum peak current of main transistor (9) at the time of setting $V_1$)

Vmo=6.3 KV (applied voltage before oscillation of magnetron (34)).

What is claimed is:

1. A switching power supply for a microwave oven in which DC power is changed to a pulse waveform by means of a power switching element coupled to a primary winding of an inverter transformer to supply the power to a magnetron coupled to a secondary winding of the inverter transformer, comprising:

a first circuit for detecting a first voltage corresponding to a current of said power switching element,
a second circuit for providing a reference voltage,
a comparator connected to said first and second circuits for comparing said reference voltage with said first voltage,
a second switching element connected to said comparator and to said power switching element for controlling switching of said power switching element responsive to an output from said comparator, and
a reference voltage controlling circuit connected to said second circuit and to the magnetron for setting the reference voltage of said second circuit to a first voltage level during oscillation of said magnetron and to a second voltage level lower than said first voltage level before start of oscillation of the magnetron.

2. The switching power supply for a microwave oven of claim 1, wherein said reference voltage controlling circuit comprises a current transformer, a resistor connected to said current transformer, and a rectifying and smoothing circuit connected to said current transformer for detecting an anode current of the magnetron flowing therethrough and for outputting to said second circuit a DC voltage corresponding thereto.

3. The switching power supply for a microwave oven of claim 1, wherein said reference voltage controlling circuit comprises an optical isolator and a transistor connected for detecting an anode current of the magnetron and for outputting to said second circuit a DC voltage corresponding thereto.

4. The switching power supply for a microwave oven of claim 1, wherein said reference voltage controlling circuit comprises current detecting circuit means for detecting a current flowing through the magnetron and for producing a detection voltage corresponding thereto, and a comparing means connected to said current detecting circuit means for comparing said detection voltage with a predetermined voltage produced by said second circuit, said comparing means connected for providing said detection voltage to said comparator as said reference voltage when said detection voltage has a lower voltage level than said predetermined voltage and for blocking said detection voltage from said comparator when said detection voltage has a higher voltage level than said predetermined voltage, thereby providing said predetermined voltage to said comparator as said reference voltage when said detection voltage has a higher voltage level than said predetermined voltage,
thereby providing to said comparator, prior to initiation of oscillation by said magnetron, a gradually increasing reference voltage which is lower than said predetermined voltage and providing to said comparator, after initiation of oscillation by said magnetron, a substantially fixed reference voltage equal to said predetermined voltage.

5. In a switching power supply for a microwave oven including an inverter transformer, a power switching element coupled to a primary winding of said inverter transformer, a magnetron coupled to a secondary winding of the inverter transformer, a reference setting circuit for setting a predetermined voltage as a reference voltage for control of a voltage provided to said inverter transformer, a detecting circuit for detecting a first voltage corresponding to a current passing through said power switching element, a comparator for comparing said reference voltage with said first voltage, and a second switching element for controlling switching of said power switching element in response to an output from said comparator, the improvement comprising:

a control circuit for preventing damage to the magnetron and to said switching power supply during periods of time when the magnetron is not oscillating,
said control circuit including
a reference voltage controlling circuit connected to the magnetron and to said comparator for setting the reference voltage for said comparator to a voltage level lower than the predetermined voltage during periods of time when the magnetron is not oscillating and for setting the reference voltage for said comparator to said predetermined voltage during periods of time when the magnetron is oscillating.

6. The switching power supply for a microwave oven of claim 5, wherein said reference voltage controlling circuit comprises current detecting circuit means connected to the magnetron for detecting a current flowing through the magnetron and for producing a detection voltage corresponding thereto, and a comparing means connected to said second circuit and to said current detecting circuit means for comparing said detection voltage with said predetermined voltage produced by said second circuit, said comparing means connected to said comparator providing said detection voltage to said comparator as said reference voltage when said detection voltage has a lower voltage level than said predetermined voltage and blocking said detection voltage from said comparator when said detection voltage has a higher voltage level than said predetermined voltage,
thereby providing to said comparator, during periods of non-oscillation by the magnetron, a gradually increasing reference voltage which is lower than said predetermined voltage and providing to said comparator, during periods of oscillation by said magnetron, a substantially fixed reference voltage equal to said predetermined voltage.

* * * * *